United States Patent
Blossfeld

(10) Patent No.: US 6,965,227 B2
(45) Date of Patent: Nov. 15, 2005

(54) TECHNIQUE FOR SENSING THE ROTATIONAL SPEED AND ANGULAR POSITION OF A ROTATING WHEEL USING A VARIABLE THRESHOLD

(75) Inventor: Lothar Blossfeld, Breitnau (DE)

(73) Assignee: Micronas GmbH, Freiburg (DE)

( * ) Notice: Subject to any disclaimer, the term of this patent is extended or adjusted under 35 U.S.C. 154(b) by 295 days.

(21) Appl. No.: 09/747,503

(22) Filed: Dec. 20, 2000

(65) Prior Publication Data

US 2001/0013775 A1 Aug. 16, 2001

(30) Foreign Application Priority Data

Dec. 20, 1999 (DE) .......................... 199 61 876

(51) Int. Cl.$^7$ ................................ G01P 3/48
(52) U.S. Cl. ................. 324/166; 324/207.12; 324/173; 324/207.25
(58) Field of Search .................. 324/207.12, 166, 324/173, 174, 207.15, 207.16, 207.17, 207.2, 207.21, 207.25

(56) References Cited

U.S. PATENT DOCUMENTS

| | | | |
|---|---|---|---|
| 3,801,380 A | | 4/1974 | Boyer |
| 3,801,830 A | * | 4/1974 | Boyer .......................... 327/68 |
| 4,764,685 A | | 8/1988 | Bleckmann et al. |
| 4,835,467 A | * | 5/1989 | Gokhale ...................... 324/166 |
| 5,103,171 A | | 4/1992 | Petersen |
| 5,446,375 A | * | 8/1995 | Perkins ....................... 324/163 |
| 5,459,398 A | * | 10/1995 | Hansen et al. .............. 324/166 |
| 5,497,084 A | | 3/1996 | Bicking |
| 5,554,948 A | | 9/1996 | Hansen et al. |
| 5,650,719 A | * | 7/1997 | Moody et al. ........... 324/207.2 |
| 5,917,320 A | | 6/1999 | Scheller et al. |
| 6,147,486 A | * | 11/2000 | Koss et al. .................. 324/166 |
| 6,215,297 B1 | * | 4/2001 | Bleckmann et al. ........ 324/166 |

FOREIGN PATENT DOCUMENTS

| | | |
|---|---|---|
| CH | 559 367 | 1/1975 |
| DE | 35 43 058 | 12/1985 |
| DE | 39 30 895 | 9/1989 |
| EP | 0 412 618 | 8/1990 |
| EP | 0 590 190 | 9/1992 |

* cited by examiner

Primary Examiner—Jay Patidar
(74) Attorney, Agent, or Firm—O'Shea. Getz & Kosakowski. P.C.

(57) ABSTRACT

To detect the rotational speed and angular position of a rotating wheel, a non-contact sensor (e.g., an optical sensor or a Hall sensor) scans scan marks on the wheel, and generates a pulse train. The amplitude of the pulses is compared in a comparator with a variable switching threshold. To achieve accurate measurement results, and to compensate for offset and long-term drift of the sensor, the switching threshold is adjusted if one or more of the following conditions is met: (i) the difference between the pulse amplitude and the switching threshold exceeds a fixable first maximum, (ii) the difference of the amplitudes of two successive pulses exceeds a fixable second maximum, (iii) the difference of the frequencies of successive pulses exceeds a fixable third maximum. The method is particularly advantageous in a motor vehicle, to detect the rotational speed and angular position for an electronic ignition system, or the rotational speed and angular position of the wheels for an ABS braking system, an anti-skid system, or a vehicle stabilization system.

14 Claims, 3 Drawing Sheets

TECHNIQUE FOR SENSING THE ROTATIONAL SPEED AND ANGULAR POSITION OF A ROTATING WHEEL USING A VARIABLE THRESHOLD

BACKGROUND OF THE INVENTION

The invention relates to a technique for detecting the rotational speed (e.g., RPMs) and the angular position of a rotating wheel with a non-contact sensing device.

For electronic control systems in motor vehicles (e.g., an ABS braking system or an electronic ignition system) it is necessary to measure parameters such as rotational speed, the relative angular position of a rotating wheel or the crankshaft and/or their angular acceleration or instantaneous angular velocity. This is often performed by a non-contact sensor (e.g., an optical sensor or a Hall sensor) that scans the rotating wheel or a wheel seated on the crankshaft. The rotating wheel typically includes scan marks (e.g., lines or teeth).

The accuracy of the rotational speed and angular position measurement is often impaired by external noise signals and/or thermal noise. In a measurement of angular position, the thermal noise is often noticeable as jitter. If a digital measurement system is used to measure the rotational speed and the angular position, there is another error source in addition to the thermal noise that garbles the measurement result. This error source is determined by the minimum digital resolution of the least significant bit (LSB) or by the clock pulse rate. Usually the measurement error caused by the minimum digital resolution of the LSB is greater than the measurement error caused by thermal noise. For example, if the position of the threshold changes within one revolution, the scanning times between the individual scan marks on the wheel also change, so that the valuation device sees an instantaneous change of the rotational velocity, although the rotational velocity has not changed.

Other error sources are the offset of the sensor and the long-term drift due to aging of the sensor, or a gradual change of temperature in the measurement environment (e.g., by the warming of the engine).

Therefore, there is a need for a technique for compensating for various error sources associated with sensing rotational speed and/or angular position.

SUMMARY OF THE INVENTION

An object of the present invention is to process a pulse train output signal provided by a non-contact sensor that senses the rotational speed and angular position of a rotating wheel, in such a way that the offset and long-term drift errors due to aging of the sensor or the offset error due to temperature change are compensated for accuracy.

To detect the rotational speed and the angular position of the wheel, the non-contact sensor (e.g., an optical sensor or a Hall sensor) scans marks on the wheel, and generates a pulse train indicative of the rotational speed and angular position of the wheel. The amplitude of the pulses is compared in a comparator with a variable switching threshold. To compensate for offset and long-term drift of the sensor, the variable switching threshold is adjusted based upon one or more characteristics of the pulse train (i.e., threshold adjustment criteria).

In one embodiment, the amplitude of the pulses from the sensor are compared in the comparator with the variable switching threshold value, which can be adjusted so the difference between the amplitudes of the pulses and the switching threshold does not exceed a fixable first maximum value. For example, when the difference between the pulse amplitude and the switching threshold of the comparator exceeds the fixable first maximum value, the switching threshold is adjusted so that this difference falls below the fixable first value. If the amplitude of the pulses generated by the sensor is greater than the switching threshold value, the switching threshold value is increased; on the other hand, the value of the switching threshold is decreased if the amplitude of the pulses is less than the switching threshold value.

In another embodiment, the positive and negative amplitude of the pulses from the sensor, or their maxima and minima, are compared in the comparator with the variable switching threshold, which is adjusted so that the difference between the extremes or the amplitudes of the pulses and the variable switching threshold does not exceed a fixable second maximum value.

In yet another embodiment, the pulses from the sensor are compared in the comparator with the variable switching threshold, which is adjusted if the difference between the amplitudes of two successive pulses exceeds a fixable third maximum value. For example, if the evaluation circuit determines that the amplitude of the second pulse is greater than that of the first pulse, the switching threshold is increased. Initially, if the amplitude of the second pulse is less than that of the first pulse, the value of the switching threshold is decreased.

In still another embodiment, the amplitude of the pulses is compared in the comparator with the variable switching threshold, which is adjusted if the difference of the frequencies of successive pulse trains exceeds a fixable fourth maximum value.

The variable switching threshold is preferably positioned by the evaluation circuit as stably as possible and is situated in the middle between the minimum and maximum sensor value.

The threshold adjustment techniques of the present invention may be used alone or in combination with one another. In addition, the switching threshold of the comparator is preferably only adjusted during the synchronization signal. It is contemplated that in some embodiments, the various individual threshold adjustment criteria may be combined with one another in order to define the criteria when the evaluation circuit may adjust the threshold. For example, consider one embodiment where the following conditions must be fulfilled simultaneously in order for the evaluation circuit to adjust the threshold:

1. The difference between the pulse amplitudes and the switching threshold exceeds a first fixable threshold value.
2. The difference of the amplitudes of successive pulses exceeds a second fixable maximum.
3. The difference of the frequencies of successive pulses exceeds the third fixable maximum.
4. The RPM of the wheel is greater than a fixable minimum.
5. A synchronization signal is generated.

Advantageously, inventive adjustment of the switching threshold improves the accuracy of the measurement. Furthermore, the offset and long-term drift of the sensor due to aging are largely compensated for.

DETAILED DESCRIPTION OF THE INVENTION

Figure 1:
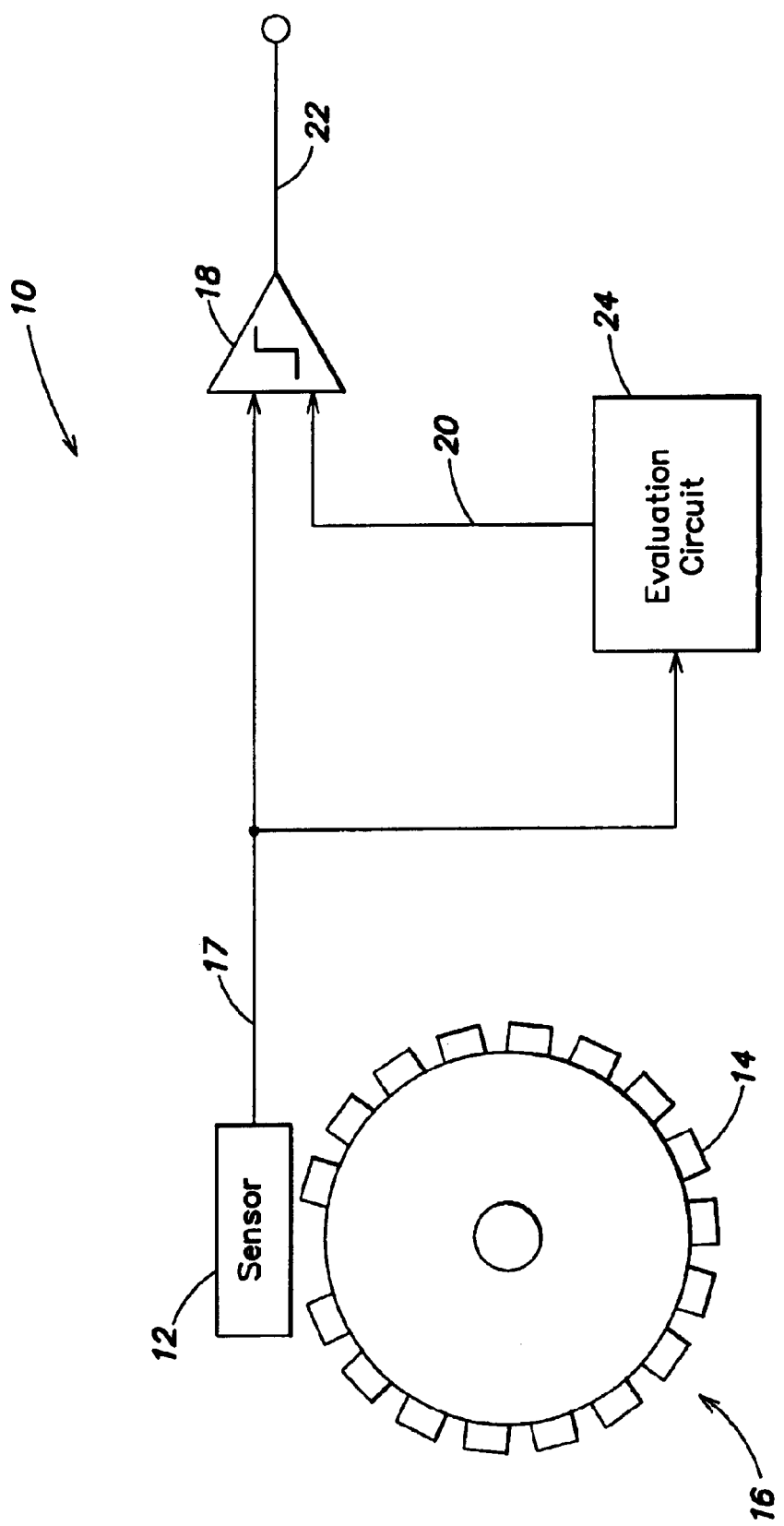
FIG. 1 illustrates a rotational sensing system.

FIG. 1 illustrates a rotational sensor system 10, which includes a sensor 12 that reads scan marks 14 on a rotating wheel 16, and provides a sensor output signal on a line 17. The sensor output signal is input to a comparator 18, which also receives a first threshold signal on a line 20, and provides a rotational sensing output signal on a line 22.

The sensor scans the scan marks on the wheel. These scan marks can be lines that are scanned (i.e., read) by an optical sensor, or they can be teeth that are scanned by a Hall sensor. The synchronization mark can be a broad line, a missing tooth, or a broad tooth. When scanning a scan mark—a line or a tooth or a tooth gap, the sensor generates a pulse or skips a pulse, for example in the case of a tooth gap. The data read by the sensor are input to an evaluation circuit that determines the relative angular position of the wheel, its instantaneous angular velocity, and/or its angular acceleration.

According to an aspect of the present invention, an evaluation circuit 24 receives the sensor output signal on the line 17 and compares the amplitude(s) of the pulses generated by the sensor 12 against the first threshold signal value on the line 20. If the difference between the amplitude of the pulses and the first threshold signal on the line 20 exceeds a fixable first maximum value, the evaluation circuit 24 adjusts the value of the first threshold signal on the line 20. For example, when the difference between the pulse amplitude and the switching threshold of the comparator exceeds the fixable first maximum value, the threshold signal on the line 20 is adjusted so that this difference again falls below the fixable first value. If the amplitude of the pulses generated by the sensor is greater than the threshold value on the line, the switching threshold value is increased; on the other hand, the value of the threshold signal on the line 20 is decreased if the amplitude of the pulses is less than the current value of the threshold.

In another embodiment, the positive and negative amplitude of the pulses from the sensor, or their maxima and minima, are compared in the comparator with a variable switching threshold. In this embodiment the variable switching threshold on the line 20 is adjusted so the difference between the amplitudes of the pulses and the variable switching threshold does not exceed a fixable second maximum value.

The evaluation circuit 24 may also be configured to compare the amplitudes of successive pulses of the sensor output signal on the line 17. If the difference of the amplitudes of the two successive pulses exceeds a fixable third maximum value, the evaluation circuit 24 adjusts the value of the switching threshold on the line 20. For example, if the evaluation circuit determines that the amplitude of the second pulse is greater than that of the first pulse, the switching threshold is increased. Initially, if the amplitude of the second pulse is less than that of the first pulse, the value of the switching threshold is decreased.

In yet another embodiment, the evaluation circuit 24 adjusts the comparator threshold if the difference of the frequencies of successive pulses exceeds a fixable fourth maximum value.

The evaluation circuit 24 may be configured to apply any of these foregoing threshold adjustment criteria either alone or in combination.

Figure 2:
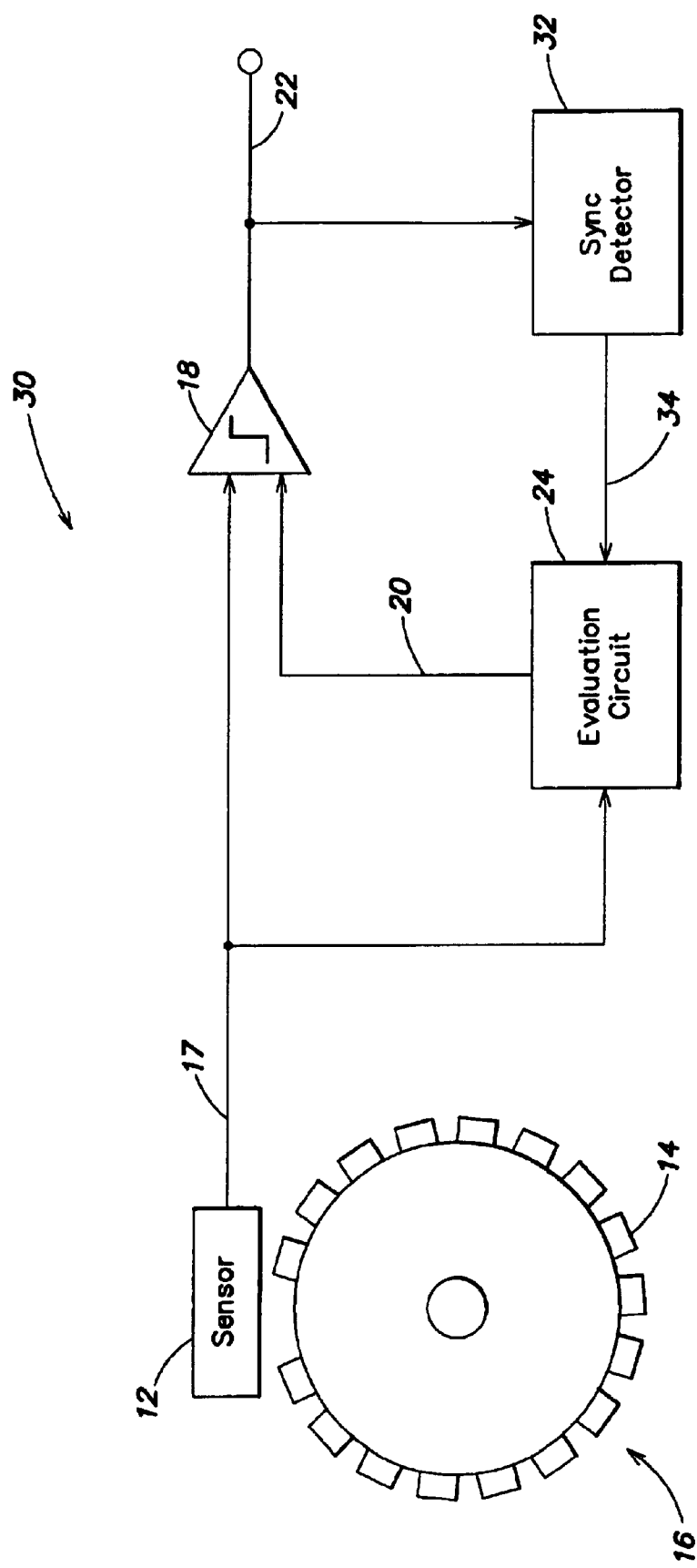
FIG. 2 illustrates an alternative embodiment rotational sensing system.

FIG. 2 illustrates an alternative embodiment rotational sensing system 30. This system also includes the sensor 12 that cooperates with the rotating wheel 16, and provides the sensor output signal on the line 17. The system illustrated in FIG. 2 is substantially similar to the system disclosed in FIG. 1, with a principal exception that the sensing system 30 illustrated in FIG. 2 includes a synchronization detector 32. The synchronization detector 32 receives the output signal on the line 22 and provides a sync output signal on a line 34, which is input to the evaluation circuit 24. In this embodiment, the evaluation circuit 24 is only allowed to make changes to the threshold signal on the line 20 when the synchronization signal on the line 34 is valid, indicating the presence of the synchronization signal. When the synchronization signal is detected, the evaluation circuit 24 is then allowed to make the adjustments as set forth above. For example, if the evaluation circuit 24 is configured to adjust the threshold when the difference between the amplitude of the pulses and the threshold signal on the line 20 exceeds the fixable first maximum value, this adjustment will only be made when the sync signal on the line 34 is valid. That is, if the sync signal on the line 34 is not valid, the threshold signal will not be adjusted even if the difference between the amplitude of the pulses and the threshold signal on the line 20 exceeds the fixable first maximum value. Of course, any of the adjustment criteria set forth above may be used alone or in combination in the system illustrated in FIG. 2.

Figure 3:
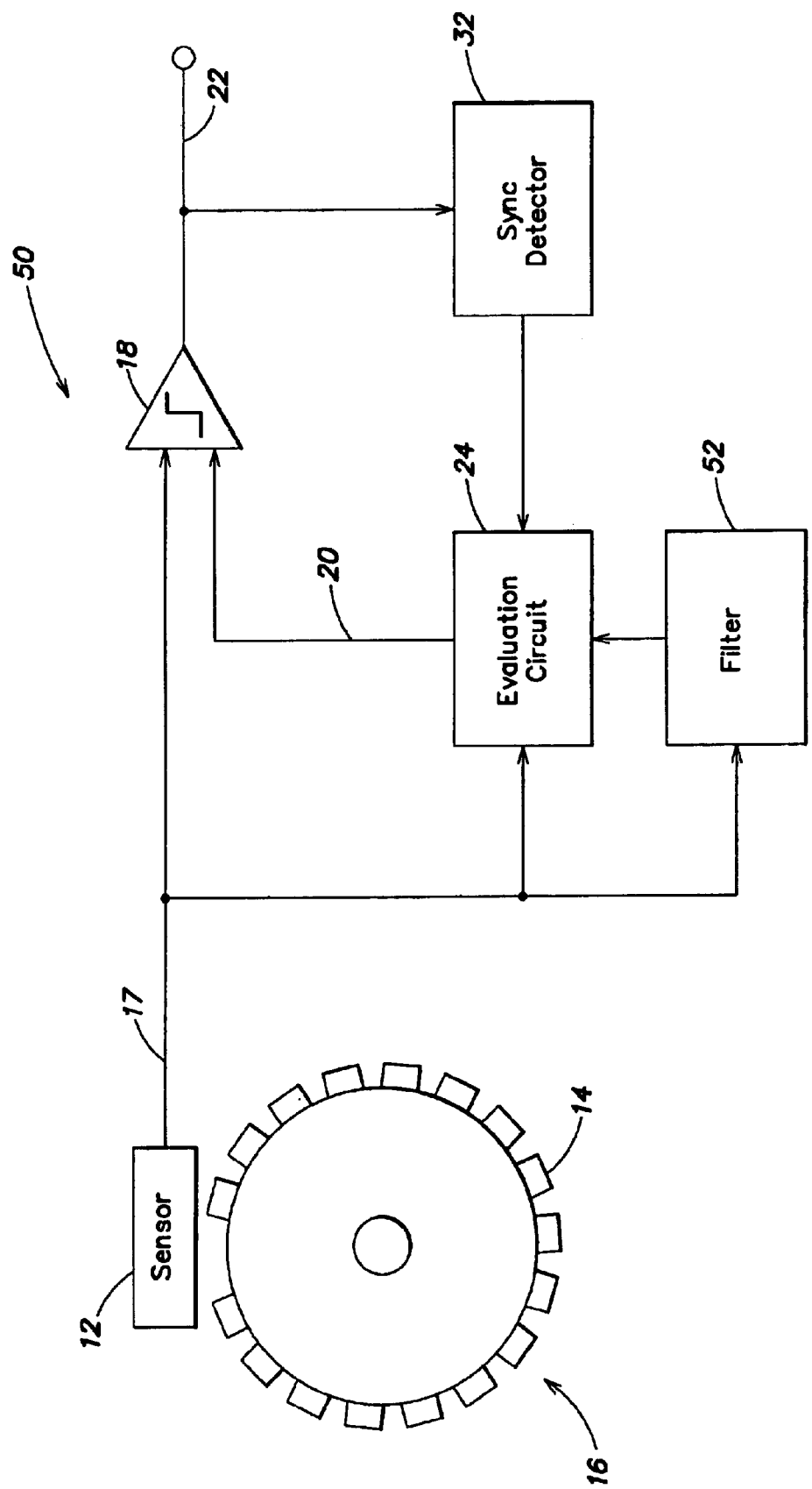
FIG. 3 illustrates yet another alternative embodiment rotational sensing system.

FIG. 3 illustrates yet another alternative embodiment rotational sensing system 50. This embodiment, is substantially the same as the embodiment illustrated in FIG. 2, with the principal exception that the embodiment in FIG. 3 includes a filter 52, that receives the sensor output signal on the line 17. The circuit arrangement shown in FIG. 3 may adjust the switching threshold in accordance with one or more of the specified threshold adjustment criteria.

The invention is especially suited for use in a motor vehicle, where, for example, it accurately measures: (i) the rotational speed and angular position of the crankshaft for an electronic ignition system, or (ii) the rotational speed and the angular position of the individual wheels for an ABS braking system, an anti-skid control, or a vehicle stabilization system.

Although the present invention has been shown and described with respect to several preferred embodiments thereof, various changes, omissions and additions to the form and detail thereof, may be made therein, without departing from the spirit and scope of the invention.

What is claimed is:

1. A method of detecting rotational speed and angular position of a rotating wheel with a non-contact sensor that provides a pulse train output signal, said method comprising:

comparing the amplitude of the pulses of the pulse train output signal with a first variable switching threshold value to provide an output signal;

receiving the output signal detect a synchronization signal and provide a sync signal indicative thereof; and adjusting said switching threshold value when the difference between the amplitudes of the pulses and said switching threshold value exceeds a fixable first maximum value and said sync signal is valid.

2. The method of claim 1, wherein said switching threshold is adjusted if the difference between the amplitudes of the pulses and said switching threshold exceeds said fixable first maximum value, and at the same time the difference between the extremes or the amplitudes and said switching threshold exceeds a fixable second maximum value.

3. The method of claim 1, wherein said switching threshold is adjusted if the difference between the amplitudes of the pulses and said switching threshold exceeds said fixable first maximum value, and at the same time the difference of the amplitudes of two successive pulses exceeds a fixable second maximum value.

4. The method of claim 1, wherein said switching threshold is adjusted if the difference between the amplitudes of the pulses and said switching threshold exceeds said fixable first maximum value, and at the same time the difference of frequencies of successive pulses exceeds a fixable second maximum.

5. The method of-claim 1, wherein said switching threshold is adjusted if the difference between the amplitudes of the pulses and said switching threshold exceeds the fixable first maximum, at the same time the difference between the extremes or the amplitudes of the pulses and the variable switching threshold exceeds a fixable second maximum, and at the same time the difference between the amplitudes of two successive pulses exceeds a fixable third maximum.

6. The method of claim 1, wherein said switching threshold is adjusted if the difference between the amplitudes of the pulses and said switching threshold exceeds said fixable first maximum and at the same time the difference between the extremes or the amplitudes the variable switching threshold exceeds a fixable second maximum, and at the same time difference of the frequencies of successive pulses exceeds a fixable third maximum.

7. The method of claim 1, wherein said switching threshold is adjusted if the difference between the amplitudes of the pulses and said switching threshold exceeds said fixable first maximum, and at the same time the difference of the amplitudes of two successive pulses exceeds a fixable second maximum, and at the same time the difference of the frequencies of successive pulses exceeds a fixable third maximum.

8. The method of claim 1, wherein said switching threshold is adjusted if the difference between the amplitudes and the pulses and said switching threshold exceeds said fixable first maximum value, and at the same time the difference between the extremes or the amplitudes of the pulses and the variable switching threshold exceeds a fixable second maximum value, and at the same time the difference between the amplitude of two successive pulses exceeds a fixable third maximum value, and at the same time the difference of the frequencies of successive pulses exceeds a fixable fourth maximum value.

9. The method of claim 8, comprising an evaluation circuit that receives said pulses and determines the relative angular position of the wheel and its instantaneous rotational velocity, and provides signals indicative thereof.

10. The method of claim 8, wherein the value of said switching threshold is increased if the difference of the amplitudes has a positive sign, and the value of said switching threshold is lowered if the difference signal has a negative sign.

11. The method of claim 8, wherein the value of said switching threshold is increased if the difference of the frequencies has a positive sign, and is lowered if the difference of the frequencies has a negative sign.

12. The method of claim 8, comprising the step of enabling the adjustment of said threshold signal if a received synchronization signal is valid.

13. A method of detecting rotational speed and angular position of a rotating wheel with a non-contact sensor that provides a pulse train output signal, said method comprising:

comparing the amplitude of the pulses of the pulse train output signal with a variable threshold value to provide an output signal;

receiving the output signal to detect a synchronization signal and provide a sync signal indicative thereof; and adjusting said variable threshold value to maintain the difference between the amplitudes of the pulses an said variable threshold value less than a first value when said sync signal is valid.

14. A method of detecting rotational speed of a rotating wheel with a non-contact sensor that provides a pulse train output signal, said method comprising:

comparing the amplitude of the pulses of the pulse train output signal with a variable threshold value to provide an output signal indicative of rotational speed;

receiving the output signal to detect a synchronization signal and provide a sync signal indicative thereof; and adjusting said variable threshold value to maintain the difference between the amplitudes of the pulses and said variable threshold value less than a first value when said sync signal is valid.

* * * * *

UNITED STATES PATENT AND TRADEMARK OFFICE
CERTIFICATE OF CORRECTION

PATENT NO. : 6,965,227 B2 Page 1 of 1
DATED : November 15, 2005
INVENTOR(S) : Lothar Blossfeld It is certified that error appears in the above-identified patent and that said Letters Patent is hereby corrected as shown below:

Column 4,
Line 60, before "detect" insert -- to --.

Column 5,
Line 20, before "at the same time" insert -- and --.
Line 28, after "maximum" insert -- , --.
Line 29, after "amplitudes" insert -- and --.
Line 31, before "difference" insert -- the --.

Column 6,
Line 32, delete "an" and insert -- and --.

Signed and Sealed this

Third Day of January, 2006

JON W. DUDAS
*Director of the United States Patent and Trademark Office*